US012544942B2

(12) United States Patent
Suto et al.

(10) Patent No.: US 12,544,942 B2
(45) Date of Patent: Feb. 10, 2026

(54) CUTTING DEVICE

(71) Applicant: Max Co., Ltd., Tokyo (JP)

(72) Inventors: Kohei Suto, Tokyo (JP); Takashi Morimura, Tokyo (JP); Kazunobu Yoshimura, Tokyo (JP); Shoma Sano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 145 days.

(21) Appl. No.: 18/397,730

(22) Filed: Dec. 27, 2023

(65) Prior Publication Data

US 2024/0207955 A1 Jun. 27, 2024

(30) Foreign Application Priority Data

Dec. 27, 2022 (JP) ................................. 2022-210196
Dec. 27, 2022 (JP) ................................. 2022-210296
(Continued)

(51) Int. Cl.
*B23D 36/00* (2006.01)
*B23D 29/00* (2006.01)
(Continued)

(52) U.S. Cl.
CPC ........... *B23D 33/02* (2013.01); *B23D 29/002* (2013.01); *B26B 15/00* (2013.01); *B26B 29/04* (2013.01); *B26B 29/06* (2013.01)

(58) Field of Classification Search
CPC .. B23D 29/002; B23D 33/02; B23D 36/0008; B23D 17/04; B23D 29/005; B26B 29/04; B26B 29/06; B26B 15/00; A01G 3/037
(Continued)

(56) References Cited

U.S. PATENT DOCUMENTS 10,799,962 B2    10/2020  Barezzani et al.
2011/0056082 A1   3/2011  Nie
(Continued)

FOREIGN PATENT DOCUMENTS

EP    2540460 A1 *  1/2013  ............. A01G 3/037
EP    3466578 A1    4/2019
(Continued)

OTHER PUBLICATIONS

Jun. 7, 2024—(EP) Extended EP Search Report13 EP App. 23220289.5.
Sep. 30, 2025—(AU) Examination Report No. 1—App 2023285964.

*Primary Examiner* — Ghassem Alie
(74) *Attorney, Agent, or Firm* — Banner & Witcoff, Ltd.

(57) ABSTRACT

An electric cutting device includes: a pair of cutting blades clamping and cutting an object; an electric motor generating a driving force for operating the cutting blades; a controller controlling the electric motor; and an operation device switched between an ON state and an OFF state by a user operation. After the operation device enters into the ON state and the pair of cutting blades start operating in a closing direction, the controller is configured to: open the pair of cutting blades when the cutting of the object is completed while the operation device is kept in the ON state; and stop closing the pair of cutting blades when the operation device changes from the ON state to the OFF state at a timing before the cutting of the object is completed.

11 Claims, 10 Drawing Sheets (30) Foreign Application Priority Data

| Dec. 27, 2022 | (JP) | ................................ | 2022-210302 |
| Dec. 27, 2022 | (JP) | ................................ | 2022-210308 |
| Dec. 27, 2022 | (JP) | ................................ | 2022-210362 |
| Dec. 27, 2022 | (JP) | ................................ | 2022-210372 |
| Dec. 27, 2022 | (JP) | ................................ | 2022-210594 |
| Dec. 27, 2022 | (JP) | ................................ | 2022-210638 |

(51) Int. Cl.
*B23D 33/02* (2006.01)
*B26B 15/00* (2006.01)
*B26B 29/04* (2006.01)
*B26B 29/06* (2006.01)

(58) Field of Classification Search
USPC ...... 83/72; 30/228, 245, 247–251, 254, 257, 30/259, 233
See application file for complete search history.

(56) References Cited

U.S. PATENT DOCUMENTS

| 2013/0055575 | A1 | 3/2013 | Delmas |
| 2013/0276313 | A1 | 10/2013 | Zhou et al. |
| 2021/0339410 | A1 | 11/2021 | Hayashi et al. |
| 2022/0312680 | A1 | 10/2022 | Nii |
| 2023/0403984 | A1* | 12/2023 | Ma .......................... A01G 3/037 |

FOREIGN PATENT DOCUMENTS

| WO | WO-2005084416 A1 * | 9/2005 | ............. A01G 3/037 |
| WO | WO-2006079668 A1 * | 8/2006 | ............. B26B 15/00 |
| WO | WO-2012088695 A1 * | 7/2012 | ............. B26B 15/00 |

* cited by examiner

CUTTING DEVICE

CROSS-REFERENCE TO RELATED APPLICATIONS

The present application claims priority from Japanese Patent Application No. 2022-210196 filed on Dec. 27, 2022, Japanese Patent Application No. 2022-210296 filed on Dec. 27, 2022, Japanese Patent Application No. 2022-210302 filed on Dec. 27, 2022, Japanese Patent Application No. 2022-210308 filed on Dec. 27, 2022, Japanese Patent Application No. 2022-210362 filed on Dec. 27, 2022, Japanese Patent Application No. 2022-210372 filed on Dec. 27, 2022, Japanese Patent Application No. 2022-210594 filed on Dec. 27, 2022, and Japanese Patent Application No. 2022-210638 filed on Dec. 27, 2022, the entire contents of which are incorporated herein by reference.

TECHNICAL FIELD

The present disclosure relates to an electric cutting device.

BACKGROUND ART

As an electric cutting device, an electric pruning shear and the like as described in US 2011/0056082 A1 are known, for example. In an electric cutting device, cutting blades are operated by a driving force of an electric motor instead of a gripping force of a user, and cut an object to be cut by clamping the object with the pair of cutting blades. After the cutting of the object to be cut is completed, the cutting blades are operated in an opposite direction by the driving force of the motor to return to an original state.

The above electric pruning shear is one in which a tree branch is set as an object to be cut, but a cutting device in which metal such as a reinforcing bar is set as the object to be cut is also known.

SUMMARY

In automatically performing a closing operation and an opening operation on a cutting blade, a timing to switch is important. If a timing to open the cutting blade is too early, there is a possibility that an object to be cut may remain uncut. On the other hand, if the timing to open the cutting blade is too late, a working time will become unnecessarily long.

It is also conceivable to leave determination of whether the object to be cut is cut to a user. For example, it is conceivable to start the closing operation at a timing when a user turns on a trigger switch, and then start the opening operation at a timing when the user turns the trigger switch back to an OFF state. However, in this case, the user has to maintain constant attention to a state of the object to be cut, which increases a workload of the user.

The electric pruning shear described in the US 2011/0056082 A1 is capable of selecting another continuous operation mode in addition to a mode in which determination is left to a user as described above. In the continuous operation mode, once the trigger switch is turned on, the cutting blade is operated continuously until the cutting of the object to be cut is completed, regardless of the state of the trigger switch.

In the continuous operation mode, there is no need for the user to maintain constant attention to the state of the object to be cut. However, for example, if a structure that must not be cut is inserted between a pair of cutting blades, even if the user notices this, a problem may occur that the cutting blades cannot be stopped by operating the trigger switch.

Illustrative aspects of the present disclosure provide a cutting device that can appropriately operate a cutting blade.

An electric cutting device according to one illustrative aspect of the present disclosure includes: a pair of cutting blades configured to clamp and cut an object; an electric motor configured to generate a driving force necessary for operating the cutting blades; a controller configured to: control an operation of the electric motor; and determine whether cutting of the object by the cutting blades is completed; and an operation device configured to be switched between an ON state and an OFF state by a user operation. After the operation device enters into the ON state and the pair of cutting blades start operating in a closing direction, the controller is configured to: start an operation of opening the pair of cutting blades in a case where the cutting of the object is completed while the operation device is kept in the ON state; and stop an operation of closing the pair of cutting blades in a case where the operation device changes from the ON state to the OFF state at a timing before the cutting of the object is completed.

In the cutting device configured as described above, when the operation device is turned on by a user, the pair of cutting blades start to operate in the closing direction. Then, when the cutting of the object is completed while the operation device remains in the ON state, the operation of opening the pair of cutting blades is automatically started. An operation direction of the cutting blades can be switched at an optimal timing without the user having to maintain constant attention to the state of the object.

On the other hand, if the operation device changes from the ON state to the OFF state at the timing before the cutting of the object is completed, the operation of closing the pair of cutting blades is stopped. Since the user can stop the cutting blades at his or her own determination, it is possible to prevent situations such as accidentally cutting something other than the object.

According to the present disclosure, a cutting device configured to appropriately operate a cutting blade is provided.

DESCRIPTION OF EMBODIMENTS

The present illustrative embodiment will be described below with reference to the accompanying drawings. In order to facilitate understanding of the description, the same components are denoted by the same reference numerals as much as possible in the drawings, and redundant descriptions will be omitted.

A first illustrative embodiment will be described. A cutting device 10 according to the present illustrative embodiment is an electric cutting device, and is configured as a device for cutting a reinforcing bar at a construction site or the like. A configuration of the cutting device 10 will be described mainly with reference to FIG. 1. The cutting device 10 includes a housing 11, a trigger switch 12, a mode switch 13, a cutting mechanism 100, a ball screw 200, a speed reducer 300, an electric motor 400, a control board 500, and a storage battery 600.

Figure 1:
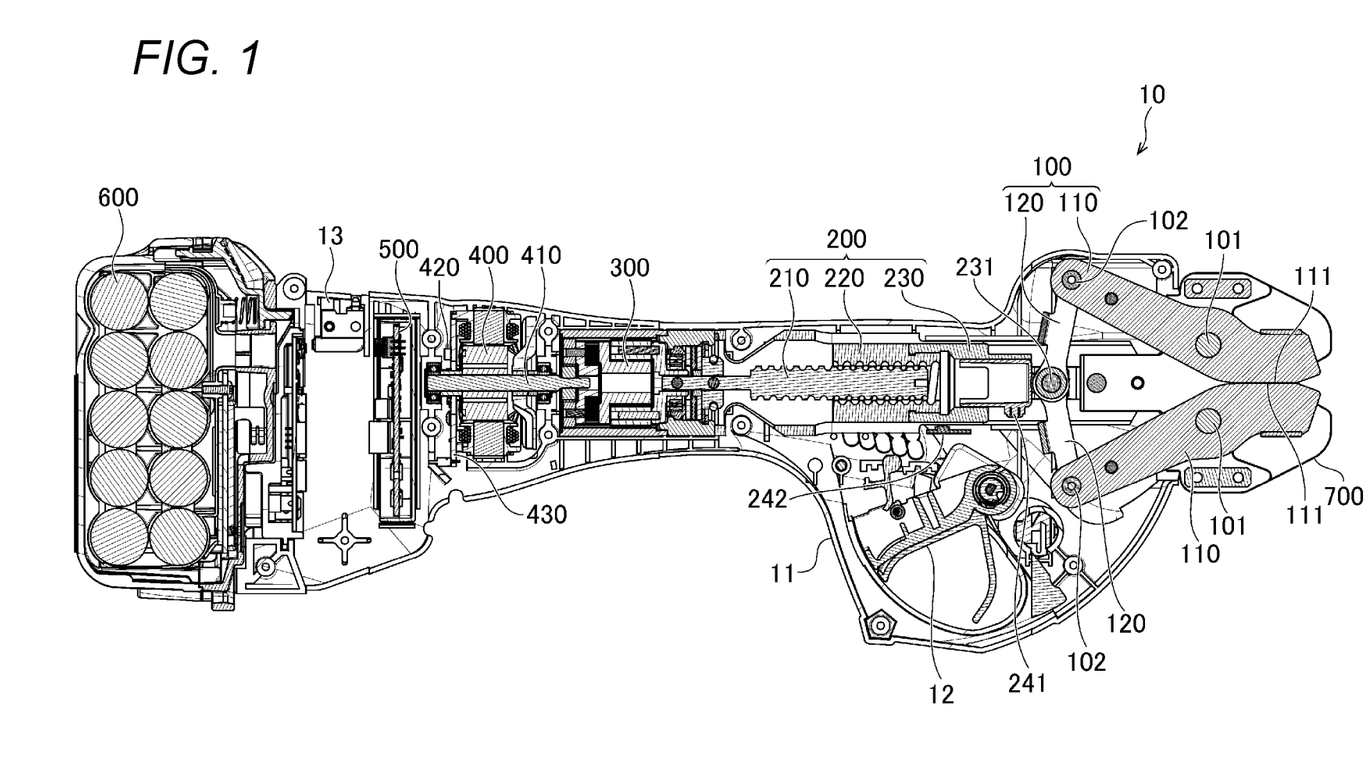
FIG. 1 is a diagram showing a configuration of a cutting device according to a first illustrative embodiment.

The housing 11 is a container that defines an outer shape of the cutting device 10. The housing 11 is made of resin, for example. The ball screw 200 described later, the speed reducer 300 described later, and the like are housed inside the housing 11. In FIG. 1, a portion of the housing 11 on a front side when viewed on paper is removed, and an internal configuration of the cutting device 10 is shown as a cross-sectional view.

The trigger switch 12 is a switch operated by a finger of a user. The user can turn on the trigger switch 12 by placing his or her finger on the trigger switch 12 and pulling the trigger switch 12 to the front side. When the user loosens his or her finger, the trigger switch 12 returns to an original position due to a force of a spring, and enters into the OFF state.

When the trigger switch 12 is switched between an ON state and the OFF state, a corresponding signal is transmitted to the control board 500 described later. As will be described later, when the trigger switch 12 is turned on by an operation of the user, an operation for cutting a reinforcing bar is started. The trigger switch 12 is one of "operation units" that can be switched between the ON state and the OFF state by the operation performed by the user. The trigger switch 12 corresponds to a "first operation unit" in the present illustrative embodiment.

The mode switch 13 is a switch operated by the finger of the user, similar to the trigger switch 12 described above. The mode switch 13 is provided at a position different from the trigger switch 12, specifically, at a position in the housing 11 near the storage battery 600. The user can turn on the mode switch 13 by pushing the mode switch 13 toward the back with the finger. When the user releases his or her finger, the mode switch 13 returns to an original position thereof due to the force of the spring, and enters into the OFF state. When the mode switch 13 is switched between the ON state and the OFF state, a corresponding signal is transmitted to the control board 500 described later. The mode switch 13 is one of the "operation units" that can be switched between the ON state and the OFF state by the operation performed by the user, and corresponds to a "second operation unit" in the present illustrative embodiment.

The mode switch 13 is a part operated by the user when shifting the cutting device 10 to a mode different from a normal mode, such as a mode for adjusting an accuracy of cutting blades 111 in a standby state. Regarding a type of a mode that can be shifted to by the second operation unit, a method of an operation performed on the mode switch 13, and the like, various known aspects can be adopted.

The cutting mechanism 100 is a portion configured to cut the reinforcing bar which is an object to be cut. The cutting mechanism 100 includes a pair of blade members 110 and a pair of link members 120.

The cutting blades 111 that clamp and cut the object to be cut are formed on the respective blade members 110. The blade member 110 is held pivotably about a shaft 101 fixed to the housing 11. In the present illustrative embodiment, the respective blade members 110 are arranged to face each other such that ridge lines of blade edges of the cutting blades 111 operate on trajectories passing through substantially the same plane. Accordingly, it is possible to switch between an opened state where the respective cutting blades 111 are spaced apart from each other and a closed state where the respective cutting blades 111 come into contact with (or close to) each other. In the example of FIG. 1, the pair of cutting blades 111 are in the closed state.

Each link member 120 is a rod-shaped member, and one end of the link member 120 is connected to the blade member 110 via a shaft 102, and the other end of the link member 120 is connected to a connection member 230 described later via a shaft 231. The link member 120 and the blade member 110 are connected to each other in a manner of pivoting about the shaft 102. Similarly, the link member 120 and the connection member 230 are connected to each other in a manner of pivoting about the shaft 231. As will be described later, the connection member 230 moves in a left-right direction in FIG. 1 by a driving force of the electric motor 400.

If the connection member 230 moves in the left direction from the state shown in FIG. 1, the blade member 110 on an upper side of FIG. 1 pivots counterclockwise, and the blade member 110 on a lower side of FIG. 1 pivots clockwise. Accordingly, the pair of cutting blades 111 change from the closed state to the opened state. On the other hand, when the pair of cutting blades 111 are in the opened state, if the connection member 230 moves in the right direction in FIG. 1, the blade member 110 on the upper side of FIG. 1 pivots clockwise, and the blade member 110 on the lower side of FIG. 1 pivots counterclockwise. Accordingly, the pair of cutting blades 111 return to the closed state. As such, the pair of blade members 110, the pair of link members 120, and the connection member 230 as a whole configure a so-called "toggle link mechanism".

Figure 2:
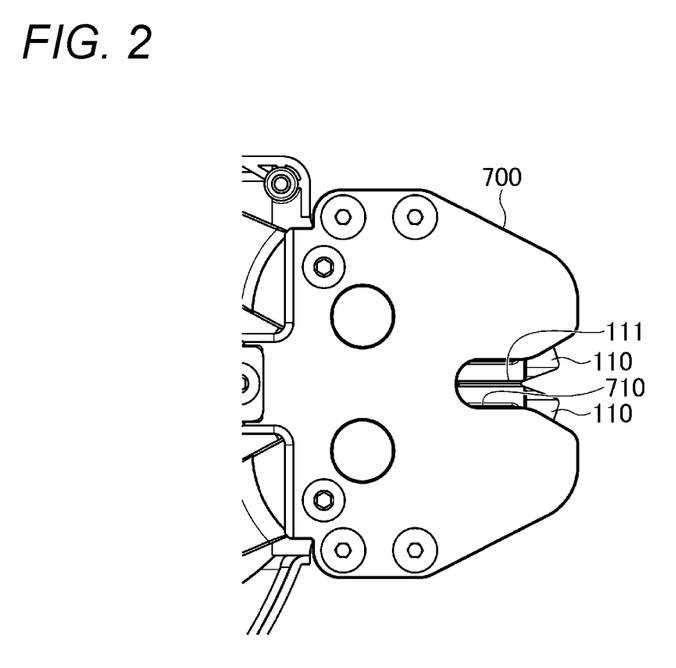
FIG. 2 is a diagram showing a configuration of guide plates included in the cutting device according to the first illustrative embodiment.

In the present illustrative embodiment, a pair of guide plates 700 are provided near the blade members 110. The guide plates 700 are plate-shaped members made of metal, and are disposed to sandwich the blade members 110 from both the front side and the back side in FIG. 1 when viewed on paper. Shapes of the pair of guide plates 700 are substantially the same. As shown in FIG. 2, each guide plate 700 has a recess 710 formed therein.

For convenience of description, a right side in FIG. 1 will also be referred to as a "front end side" below, and a left side in FIG. 1 will be referred to as a "rear end side" below. The recess 710 is formed to recede from the front end side toward the rear end side of the guide plate 700. When the cutting device 10 is viewed from a side as shown in FIGS. 1 and 2, each recess 710 is formed at a position that includes the cutting blade 111 in the closed state. In the standby state where the cutting blades 111 are fully opened, the cutting blades 111 are retracted to the outside of the recesses 710, and from a perspective of FIG. 2, the entire blade members 110 are hidden by the guide plates 700. The guide plates 700 have both a function of covering and protecting the cutting blades 111 in the standby state, and a function of guiding the reinforcing bar, which is the object to be cut, along the recesses 710 between the pair of cutting blades 111. The guide plates 700 further have a function of stabling a posture of the cutting device 10 before and after cutting by sandwiching the reinforcing bar in the recesses 710.

The ball screw 200 is configured to convert a rotational movement of the electric motor 400 into a linear movement of the connection member 230, thereby causing the cutting mechanism 100 to operate. The ball screw 200 includes a screw shaft 210, a nut 220, and the connection member 230.

The screw shaft 210 is a rod-shaped member that extends linearly from the rear end side to the front end side. A male screw is formed on an outer peripheral surface of the screw shaft 210. When the electric motor 400 is driven, the screw shaft 210 rotates about a central axis thereof.

The nut 220 is a substantially cylindrical member disposed to surround the screw shaft 210 from an outer peripheral side. A female screw is formed on an inner peripheral surface of the nut 220, and is screwed to the male screw formed on the outer peripheral surface of the screw shaft 210. While the nut 220 is allowed to move along a longitudinal direction of the screw shaft 210, rotation about the central axis of the screw shaft 210 is restricted. Therefore, when the screw shaft 210 rotates about the central axis thereof, the nut 220 moves in the left-right direction in FIG. 1 along the central axis.

The connection member 230 is attached to the nut 220 and is movable along the screw shaft 210 together with the nut 220. The connection member 230 is attached in a manner of protruding from the nut 220 toward the front end side. The pair of link members 120 are connected to a portion of the connection member 230 near an end on the front end side via the shaft 231 described above.

A magnet 241 is attached to the outer peripheral surface of the connection member 230. A Hall sensor 242 is attached to the housing 11 at a position near the connection member 230. The position where the Hall sensor 242 is attached is such that when the nut 220 moves to a rear end from the state shown in FIG. 1 and the cutting blades 111 are fully opened, the Hall sensor 242 faces the magnet 241 of the connection member 230. When the cutting blades 111 are fully opened, a signal is transmitted from the Hall sensor 242 by facing the magnet 241, and the signal is input to the control board 500.

The speed reducer 300 is a device that is configured to reduce a rotation speed of an output shaft 410 of the electric motor 400 and then transmit the rotation to the screw shaft 210 of the ball screw 200.

The electric motor 400 is a rotating electrical machine for generating a driving force necessary for operating the cutting blades 111, and is, for example, a brushless DC motor. The electric motor 400 has the output shaft 410. The output shaft 410 is a substantially cylindrical member. A central axis of the output shaft 410 coincides with the central axis of the screw shaft 210. A part of the output shaft 410 protrudes toward the speed reducer 300 and is connected to the speed reducer 300.

When current is supplied to a coil of the electric motor 400, the output shaft 410 rotates about the central axis thereof. The rotation of the output shaft 410 is transmitted to the screw shaft 210 via the speed reducer 300, and causes the nut 220 to move toward the front end side or the rear end side. Accordingly, the cutting blades 111 of the cutting mechanism 100 are operated to open and close as described above.

A rotation sensor 420 is provided inside the electric motor 400. The rotation sensor 420 is configured to emit a pulse signal every time the output shaft 410 rotates by a predetermined angle. The rotation sensor 420 is provided on a board 430 included in the electric motor 400. The pulse signal from the rotation sensor 420 is transmitted to the control board 500. By counting the number of pulse signals, the control board 500 is able to know a rotation angle of the output shaft 410 after a specific timing. The control board 500 is also able to know the rotation speed of the output shaft 410 based on the number of pulse signals input per unit time. The rotation sensor 420 may be a different type of a sensor from that of the present illustrative embodiment, or may be a sensor separately provided at a position different from the electric motor 400 as long as the sensor can measure the rotation angle and the rotation speed of the output shaft 410.

The control board 500 is a circuit board provided to control an overall operation of the cutting device 10 including the electric motor 400. The control board 500 includes an inverter circuit configured to adjust current supplied to the electric motor 400, a microcomputer configured to control a switching operation and the like in the inverter circuit, and the like.

The storage battery 600 stores electric power necessary for operating the electric motor 400 and the control board 500, and is, for example, a lithium ion battery. In the cutting device 10, a portion in which the storage battery 600 is built is detachable from the housing 11 as a battery pack, and is connected to and charged by an external charger. Instead of such an aspect, a configuration may be adopted in which the storage battery 600 can be charged while the storage battery 600 is attached to the housing 11.

Figure 3:
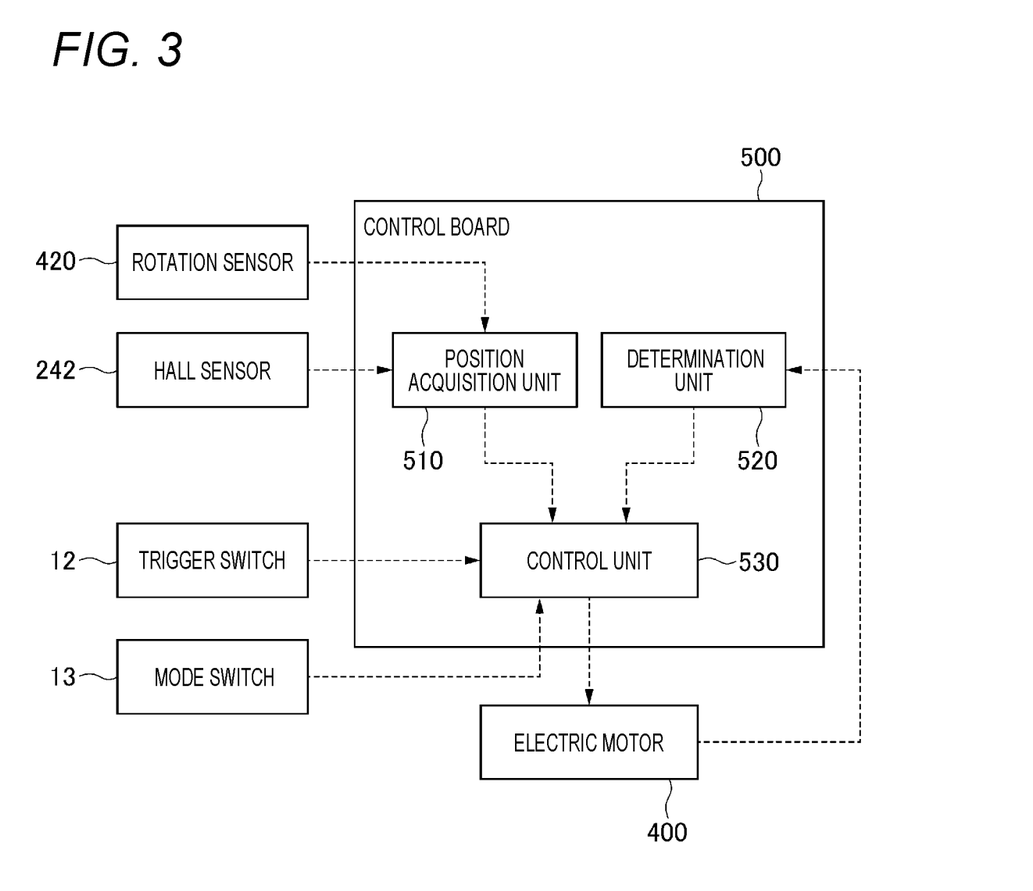
FIG. 3 is a diagram showing a configuration of a control board included in the cutting device according to the first illustrative embodiment.

A configuration of the control board 500 will be described with reference to FIG. 3. The control board 500 having the microcomputer includes a position acquisition unit 510, a determination unit 520, and a control unit 530 as elements representing functions of the control board 500.

The position acquisition unit 510 is configured to perform processing of acquiring a current position of the cutting blades 111. In the present illustrative embodiment, a count value of the pulse signal input from the rotation sensor 420 is calculated and acquired by the position acquisition unit 510 as the "current position" of the cutting blades 111, based on a time when the magnet 241 and the Hall sensor 242 face each other. The "current position" acquired by the position acquisition unit 510 may be any index that directly or indirectly indicates the current position of the cutting blades 111, and may be a value other than the count value of the pulse signal. For example, when the angle between the pair of cutting blades 111 is set as θ, a value of θ may be used as the above "current position".

In order to enable acquisition of the current position of the cutting blades 111, a reset operation may be performed when the cutting device 10 is started up. In the reset operation, for example, the electric motor 400 may be driven in a direction where the pair of cutting blades 111 change from the closed state to the opened state, and the electric motor 400 may be stopped at a time point when a detection signal from the Hall sensor 242 is input. By starting counting the pulse signals from this time point, the current position of the cutting blades 111 can be accurately acquired from then on.

Figure 4:
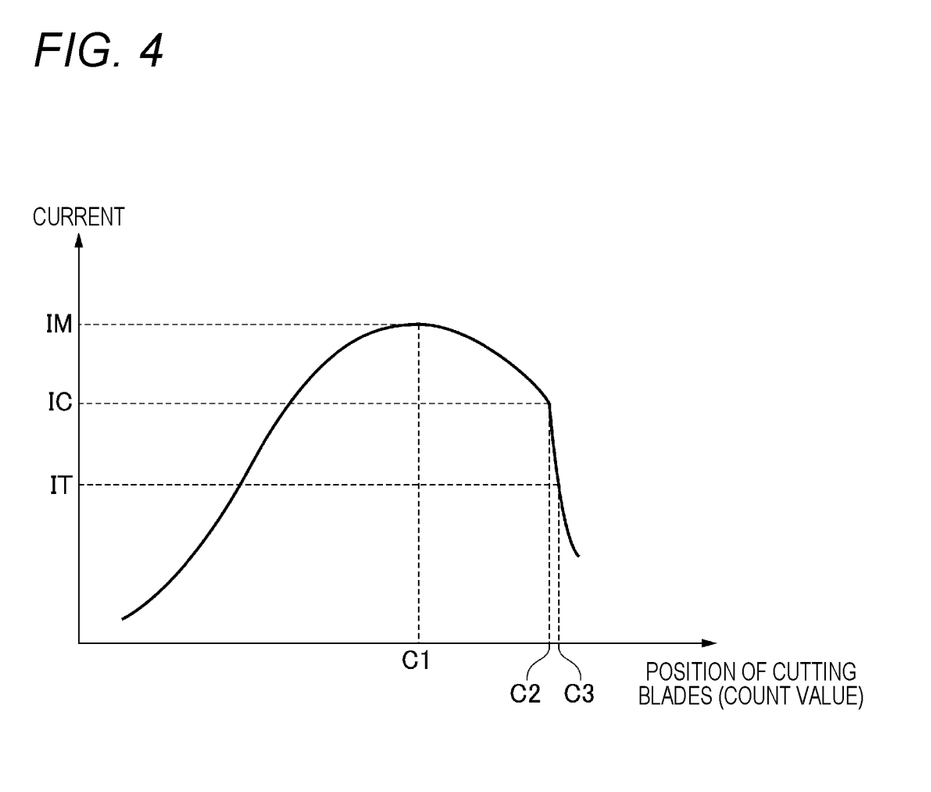
FIG. 4 is a diagram for illustrating a method of determining whether cutting is completed.

The determination unit 520 is configured to perform processing of determining whether the cutting of the object to be cut by the cutting blades 111 is completed. A method of this determination performed by the determination unit 520 will be described with reference to FIG. 4. FIG. 4 shows a relationship between the current position of the cutting blades 111, that is, the above count value (horizontal axis), and a value of current supplied to the electric motor 400 (vertical axis). The determination unit 520 according to the present illustrative embodiment constantly monitors the value of current supplied to the electric motor 400, and determines whether the cutting of the object to be cut is completed based on a change in the value of current. The value of current supplied to the electric motor 400 may be measured by, for example, a current sensor (not shown) built into the electric motor 400. The current sensor may be provided outside the electric motor 400.

When the electric motor 400 causes the cutting blades 111 to operate in a closing direction to cut the reinforcing bar, the value of current gradually increases in accordance with the resistance from the reinforcing bar. When plastic deformation of the reinforcing bar progresses and a yield point is reached, the value of current reaches a maximum, and thereafter the value of current gradually decreases. In FIG. 4, the count value at a time point when the yield point is reached is shown as "C1", and the value of current at that time is shown as "IM".

When the cutting blades 111 are further operated in the closing direction, in many cases, the reinforcing bar breaks before the cutting blades 111 reach the fully closed position. If the reinforcing bar breaks, the value of current also drops rapidly as the load drops. In FIG. 4, the count value at a time point when the reinforcing bar breaks is shown as "C2", and the value of current at that time is shown as "IC".

"IT" shown in FIG. 4 represents the value of current which is 50% of a maximum value (IM) at the yield point. "C3" shown in FIG. 4 represents the count value at a timing when the value of current decreases to IT. The value of current (IT), which is 50% of the maximum value (IM) at the yield point, is a value set in advance through experiments and the like as a value of current which is reliably lower than the value of current (IC) at which the reinforcing bar breaks. The value of 50% may be changed as appropriate. For example, the value of current (IT) may be set in a range of from 45% or more to 80% or less of the maximum value (IM) at the yield point.

The determination unit 520 determines that the cutting of the object to be cut by the cutting blades 111 is completed, that is, the reinforcing bar breaks when the value of current of the electric motor 400 decreases to IT set as described above or lower. That is, IT is used as a threshold for determining whether the cutting of the object to be cut is completed.

As described above, the determination unit 520 is configured to determine that the cutting of the object to be cut by the cutting blades 111 is completed when current supplied to the electric motor 400 decreases by a predetermined percentage (50% in the present illustrative embodiment) from a maximum value thereof.

As the method of determination performed by the determination unit 520, methods other than those described above may be used. For example, the number of rotations of the electric motor 400 suddenly increases at the timing when the reinforcing bar breaks. Therefore, the determination unit 520 may determine that the cutting is completed at the timing when the number of rotations of the electric motor 400 exceeds a predetermined threshold, or when a rate of change in the number of rotations exceeds a predetermined threshold.

Returning to FIG. 3, the description will be continued. The control unit 530 is configured to control the operation of the electric motor 400. The control unit 530 controls an opening and closing operation of the cutting blades 111 by adjusting magnitude of current supplied to the electric motor 400, for example, by PWM control. The control unit 530 also controls a braking operation of the cutting blades 111 by performing a so-called "short braking" that short-circuits some of a plurality of coils included in the electric motor 400 periodically or continuously.

Figure 5A:
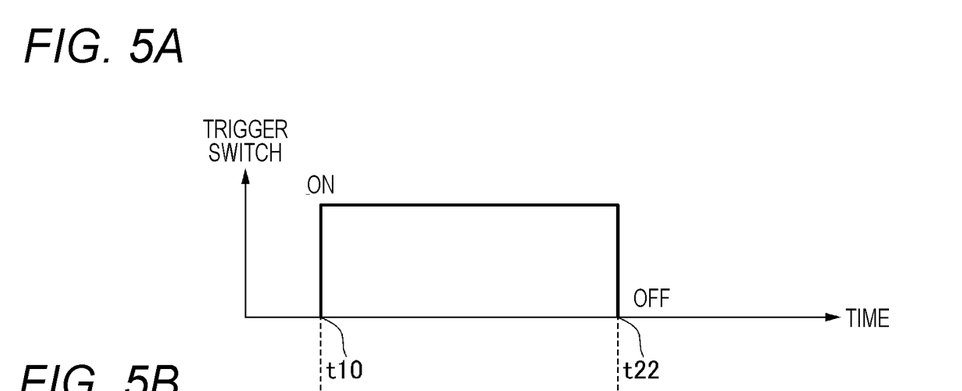
FIG. 5A, FIG. 5B, and FIG. 5C are diagrams for illustrating an operation of cutting blades according to a state of a trigger switch in the first illustrative embodiment.

An overview of processing executed by the control board 500 will be described with reference to FIGS. 5A, 5B, 5C, 6A, and 6B. FIG. 5A shows an example of a temporal change in a state of the trigger switch 12. In this example, the trigger switch 12 is turned on at a time t10, and then turned off at a time t22.

Figure 5B:
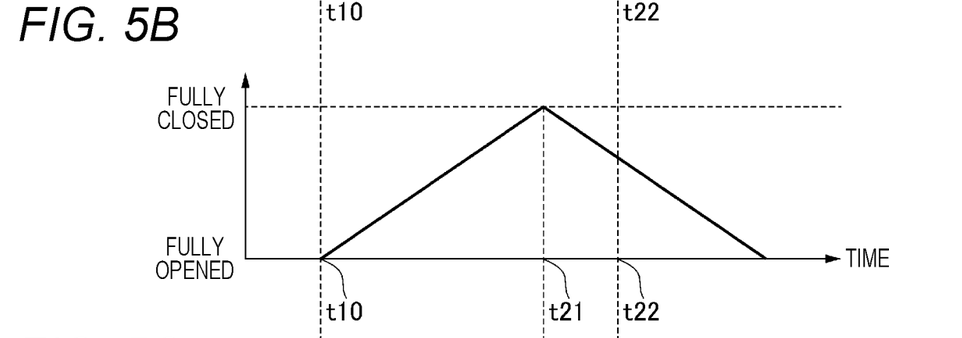

FIG. 5B shows an example of a change in the position of the cutting blades 111 when the trigger switch 12 is operated as described above. In this example, the cutting blades 111 are operated in a state where no reinforcing bar is present between the cutting blades 111. When the trigger switch 12 is turned on at the time t10, the cutting blades 111 move from the fully opened position to the fully closed position at a substantially constant speed. In the example of FIG. 5B, the cutting blades 111 reach the fully closed position at a time t21 which is before the time t22. Although the trigger switch 12 continues to be in the ON state, after the time t21, the cutting blades 111 automatically moves in an opposite direction and returns to the original fully opened position. No matter at what timing after the time t21 the trigger switch 12 is returned to the OFF state, the operation of the cutting blades 111 as described above does not change.

Figure 5C:
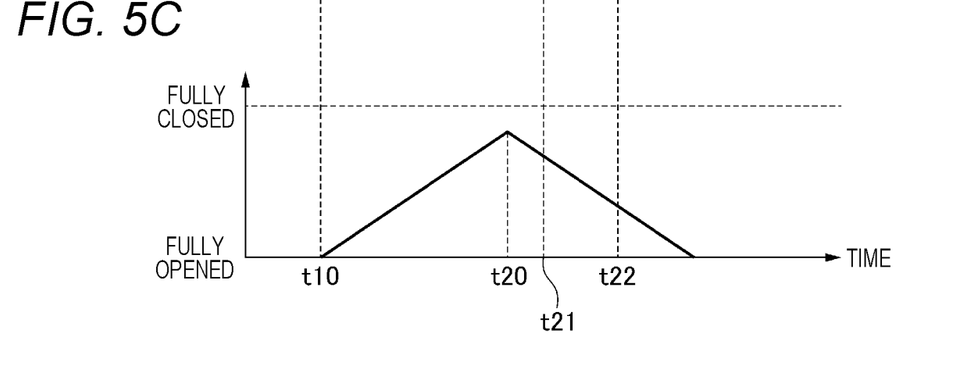

FIG. 5C shows an example of a change in the position of the cutting blades 111 when the trigger switch 12 is operated as shown in FIG. 5A in a state where the reinforcing bar is inserted between the cutting blades 111. In this example, before the cutting blades 111 reach the fully closed position, the determination unit 520 determines that the cutting of the reinforcing bar is completed at a time t20. In this case, the cutting blades 111 stop operating at the time t20, and thereafter return to the fully opened position. No matter what timing after the time t20 the trigger switch 12 is returned to the OFF state, the operation of the cutting blades 111 as described above does not change.

As described above, after the trigger switch 12 enters into the ON state and the pair of cutting blades 111 start to operate in the closing direction, if the cutting blades 111 reach a predetermined position (in this example, the fully closed position) with the trigger switch 12 in the ON state, the control unit 530 starts the operation of opening the pair of cutting blades 111. The control unit 530 starts the operation of opening the pair of cutting blades 111 even when the cutting of the reinforcing bar is completed while the trigger switch 12 is in the ON state.

Figure 6A:
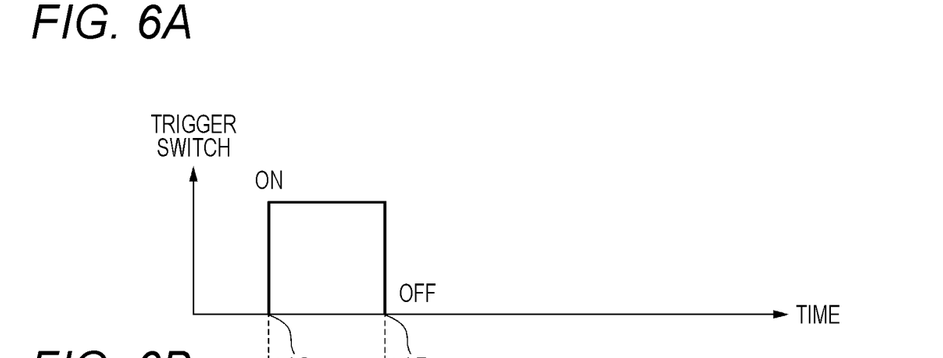
FIG. 6A and FIG. 6B are diagrams for illustrating an operation of the cutting blades according to the state of the trigger switch in the first illustrative embodiment.

FIG. 6A shows an example of a temporal change in the state of the trigger switch 12. In this example, the trigger switch 12 is turned on at a time t10, and then turned off at a time t15. The time t15 is earlier than the time t20 in the example of FIG. 5C.

Figure 6B:
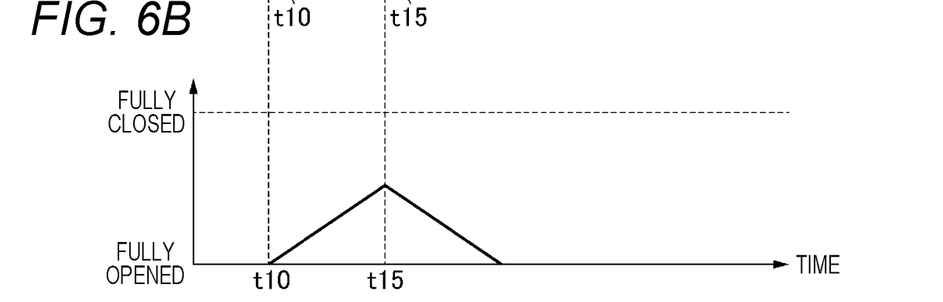

FIG. 6B shows an example of a change in the position of the cutting blades 111 when the trigger switch 12 is operated as described above. In this example, after the cutting blades 111 start operating toward the fully closed position, the trigger switch 12 is returned to the OFF state at the timing (time t15) before reaching the fully closed position. In this case, the cutting blades 111 stop operating at the time t15, and thereafter operate toward the fully opened position. The cutting blades 111 stop operating at a time point when the cutting blades 111 return to the original fully opened position thereof.

As described above, after the trigger switch 12 enters into the ON state and the pair of cutting blades 111 start to operate in the closing direction, if the trigger switch 12 changes from the ON state to the OFF state at a timing before the cutting of the reinforcing bar is completed, the control unit 530 stops the operation of closing the cutting blades 111 and then starts the operation of opening the cutting blades 111.

Specifically, the description "timing before the cutting of the reinforcing bar is completed" in the above is a timing before the cutting blades 111 reach the predetermined position (in this example, the fully closed position) and a timing before the cutting of the reinforcing bar is completed.

At a time point before the cutting of the reinforcing bar is completed or before the cutting blades 111 reach the fully closed position, the user can return the trigger switch 12 to the OFF state to immediately stop the cutting blades 111 that are operating in the closing direction. Therefore, it is possible to prevent situations such as accidentally cutting something other than the reinforcing bar.

Figure 7:
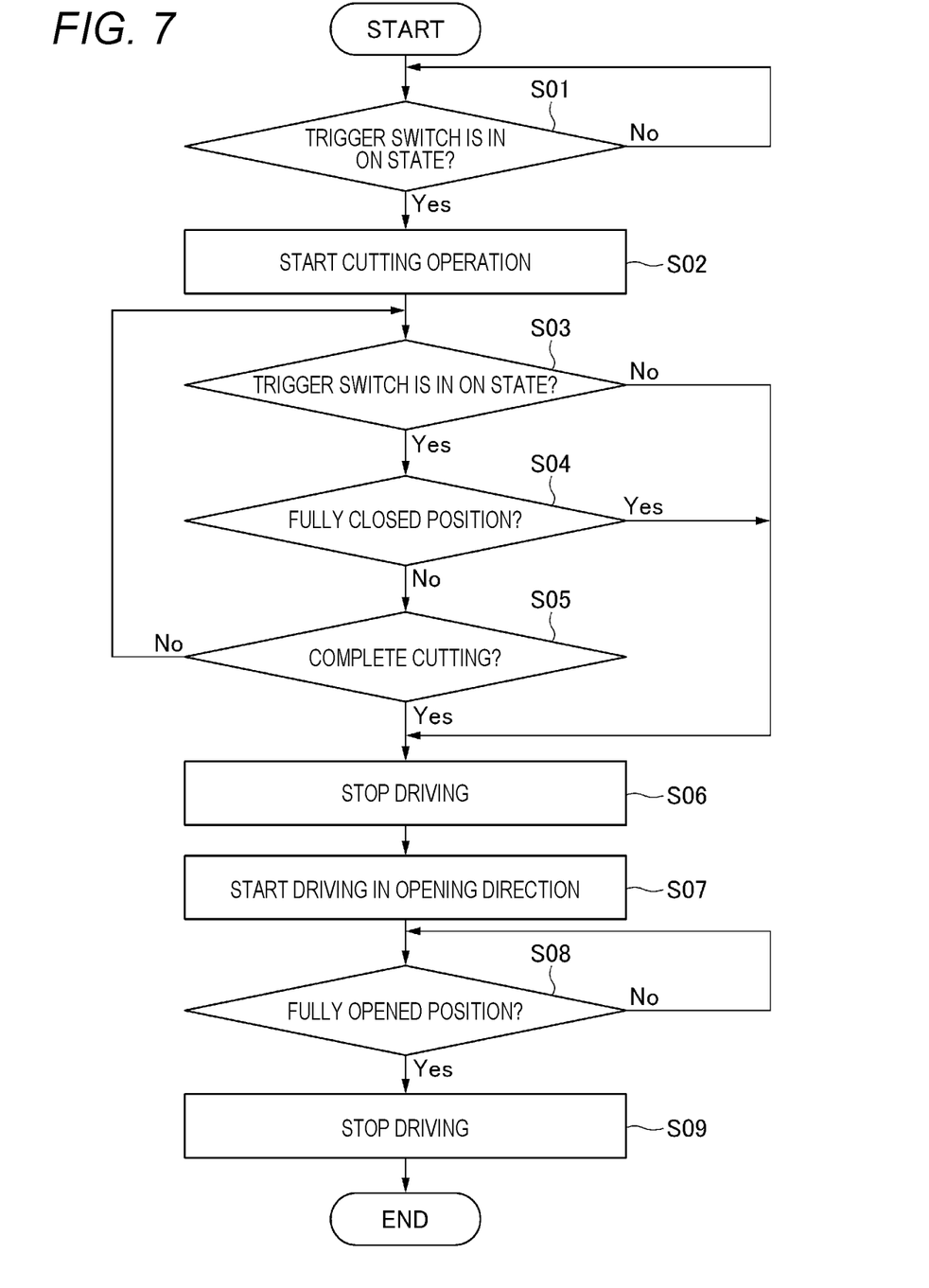
FIG. 7 is a flowchart showing a flow of processing executed by the control board.

A specific flow of processing executed by the control board 500 will be described. A series of processing shown in a flowchart of FIG. 7 is started by and performed by the control board 500 when the cutting device 10 is in a standby state, that is, when the cutting blades 111 are in the opened state.

In a first step S01, it is determined by the control board 500, for example, whether the trigger switch 12 is in the ON state. If the trigger switch 12 is kept in the OFF state, the processing in step S01 is executed again and the standby state is maintained. If the trigger switch 12 enters into the ON state, the processing proceeds to step S02.

In step S02, the control unit 530 performs processing of driving the electric motor 400 to start operating the cutting blades 111 in the closing direction.

In step S03 following step S02, it is determined again by the control board 500, for example, whether the trigger switch 12 is in the ON state. If the trigger switch 12 is kept in the ON state, the processing proceeds to step S04. In step S04, it is determined by the control board 500, for example, whether the cutting blades 111 reach the fully closed position. In the present illustrative embodiment, the position where the pair of cutting blades 111 come into contact with each other is set as the "fully closed position", but the position immediately before the pair of cutting blades 111 come into contact with each other may be set as the "fully closed position".

If the cutting blades 111 do not reach the fully closed position, the processing proceeds to step S05. In step S05, the determination unit 520 performs processing of determining whether the cutting by the cutting blades 111 is completed, that is, whether the reinforcing bar breaks. The method of determination is as already described with reference to FIG. 4. A specific processing flow for the determination will be described later with reference to FIG. 8.

In step S05, if the cutting by the cutting blades 111 is not completed, the processing in and after step S03 is executed again while continuing the operation of the cutting blades 111 toward the fully closed position.

If the trigger switch 12 is returned to the OFF state in step S03, the processing proceeds to step S06. If the cutting blades 111 reach the fully closed position in step S04 or if it is determined that the cutting is completed in step S05, the processing also proceeds to step S06. In step S06, processing of stopping the operation of the cutting blades 111 is performed. Specifically, processing such as a short braking for braking the cutting blades 111 is started. In step S06, the cutting blades 111 may be stopped by simply stopping current supplied to the electric motor 400.

Even after the processing in step S06 is started, the cutting blades 111 continue to advance in the closing direction by a braking distance. In consideration of this point, in step S04, the determination of Yes may be made at a time point when the cutting blades 111 reach a position that is closer than the fully closed position by the braking distance. The braking distance in that case may be changed each time depending on the operation speed of the cutting blades 111 at that time point.

By performing the processing described above, in a period before the cutting blades 111 reach the fully closed position and before the cutting of the reinforcing bar is completed, if the trigger switch 12 enters into the OFF state, the processing immediately proceeds to step S06 to stop the cutting blades 111.

In step S07 following step S06, the control unit 530 performs the processing of driving the electric motor 400 to start operating the cutting blades 111 in the opening direction.

In step S08 following step S07, it is determined by the control board 500, for example, whether the cutting blades 111 reach the fully opened position. If the cutting blades 111 do not reach the fully opened position, the processing in step S08 is executed again while continuing the operation of the cutting blades 111 toward the fully opened position. If the cutting blades 111 reach the fully opened position, the processing proceeds to step S09. In step S09, similar to step S06, processing of stopping the operation of the cutting blades 111 is performed.

Even after the processing in step S09 is started, the cutting blades 111 continue to advance in the opening direction by a braking distance. In consideration of this point, in step S08, the determination of Yes may be made at a time point when the cutting blades 111 reach a position that is closer than the fully opened position by the braking distance. The braking distance in that case may be changed each time depending on the operation speed of the cutting blades 111 at that time point.

By performing the processing as described above, in a period after the cutting blades 111 reach the fully closed position or after the cutting of the reinforcing bar is completed, the cutting blades 111 automatically move to the fully opened position regardless of the state of the trigger switch 12.

A specific flow of the processing performed in step S05 to determine whether the cutting by the cutting blades 111 is completed will be described with reference to FIG. 8. If the processing proceeds to step S05 in FIG. 7, the determination unit 520 executes a series of processing shown in FIG. 8.

In a first step S11 of the processing, it is determined whether a count value indicating the current position of the cutting blades 111 is larger than or equal to a predetermined value. The "predetermined value" is set in advance to indicate the position of the cutting blades 111 at a timing after the value of current of the electric motor 400 is stably detected. In the example of FIG. 4, the predetermined value is set at a position closer to the front side (on an opening direction side, a left side in FIG. 4) than C1 corresponding to the yield point.

If the count value is less than the predetermined value, the processing proceeds to step S16. In step S16, it is determined that the cutting by the cutting blades 111 is not completed. Thereafter, the processing proceeds to step S03 from step S05 in FIG. 7.

Figure 8:
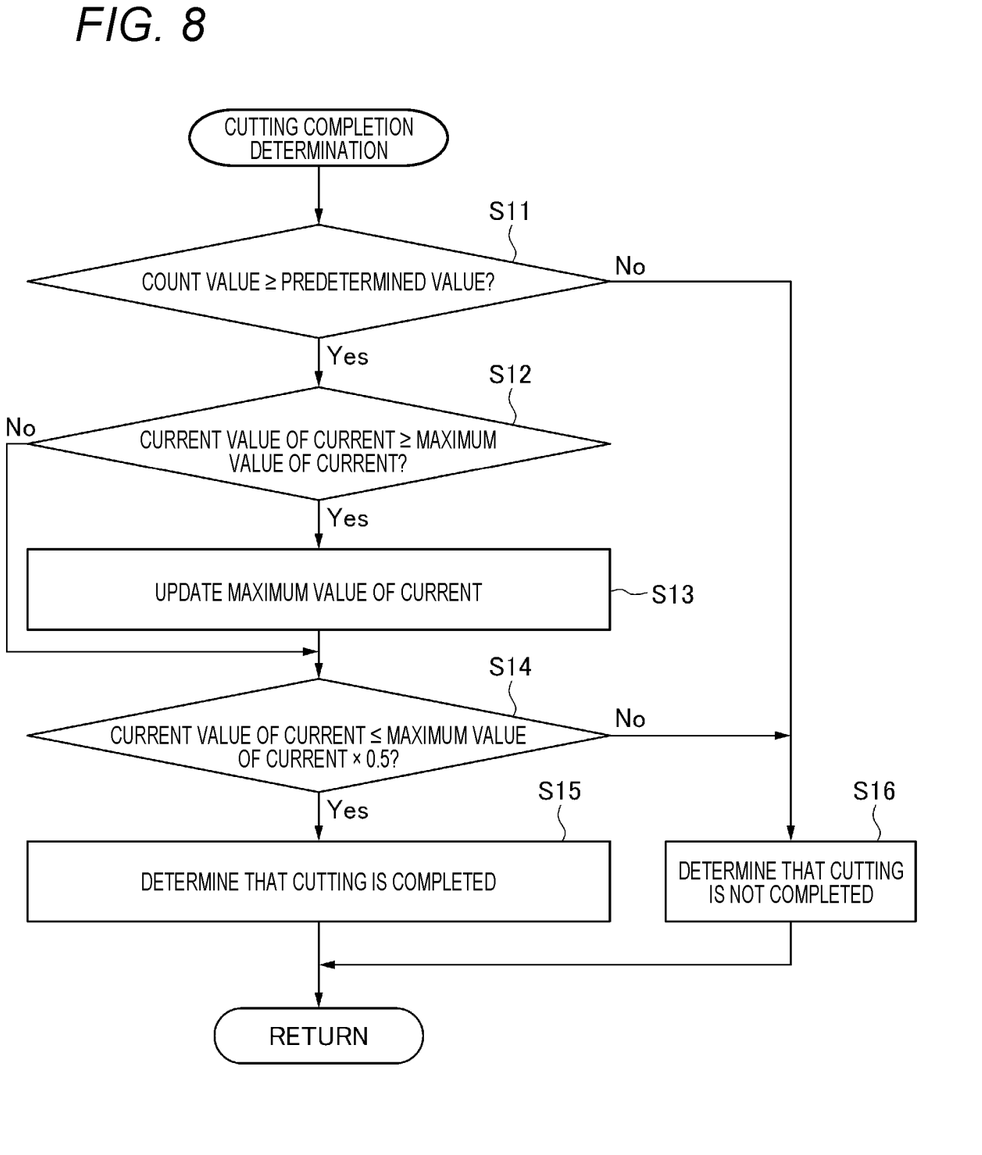
FIG. 8 is a flowchart showing a flow of processing executed by the control board.

In step S11 of FIG. 8, if the count value is larger than or equal to the predetermined value, the processing proceeds to step S12. In step S12, it is determined whether the value of current currently supplied to the electric motor 400 is larger than or equal to a maximum value of current. The "maximum value of current" is a variable for storing the maximum value of current supplied to the electric motor 400, and is used to store IM of FIG. 4 in advance. Before the processing of FIG. 8 is started for the first time, the maximum value of current is reset to 0 in advance. The processing may be executed, for example, immediately before step S02 in FIG. 7.

In step S12, if the current value of current is larger than or equal to the maximum value of current, the processing proceeds to step S13. In step S13, the maximum value of current is updated. Specifically, the current value of current is substituted for the maximum value of current. Then, the processing proceeds to step S14. In step S12, if the current value of current is less than the maximum value of current, the processing proceeds to step S14 without performing step S13.

In step S14, it is determined whether the current value of current is 50% or less of the maximum value of current. If the current value of current decreases to 50% or less of the maximum value of current, the processing proceeds to step S15. Proceeding to step S15 means that the value of current decreases to the value of current IT or less in the example of FIG. 4. Therefore, in this case, it is determined that the cutting by the cutting blades 111 is completed. Then, the processing proceeds to step S06 from step S05 in FIG. 7. In step S14, if the current value of current exceeds 50% of maximum value of current, the processing proceeds to step S16. As described above, in step S16, it is determined that the cutting by the cutting blades 111 is not completed.

As described above, the determination unit 520 according to the present illustrative embodiment determines whether the cutting of the reinforcing bar by the cutting blades 111 is completed based on current supplied to the electric motor 400. Accordingly, the determination in step S05 in FIG. 7 can be made accurately, and the cutting blades 111 can be returned to the opened state at an appropriate timing.

A second illustrative embodiment is described. In the following, points different from the first illustrative embodiment will be mainly described, and descriptions of points common to those of the first illustrative embodiment will be omitted as appropriate. The present illustrative embodiment differs from the first illustrative embodiment in contents of the processing executed by the control board 500.

In the present illustrative embodiment, similar to the first illustrative embodiment described above, the cutting blades 111 are also automatically returned to the opened state when the cutting is completed. Even if the trigger switch 12 is turned off before the cutting is completed, the cutting blades 111 are automatically returned to the opened state. In such a configuration, when the operation of the cutting device 10 is stopped, the cutting blades 111 are always kept in the opened state. However, when the cutting device 10 is not operated for a long time, the cutting blades 111 may preferably be kept in the closed state for safety reasons.

Therefore, in the cutting device 10 according to the present illustrative embodiment, the cutting blades 111 can be kept in the closed state in advance by the user performing a specific operation.

Figure 9A:
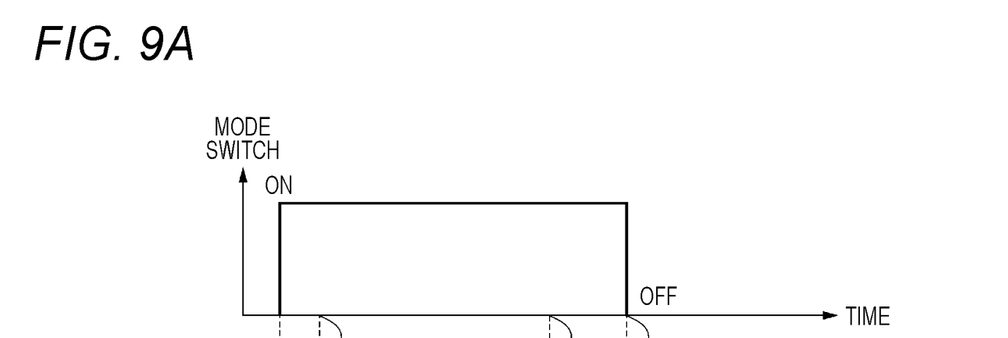
FIG. 9A, FIG. 9B, and FIG. 9C are diagrams for illustrating an operation of cutting blades according to a state of a trigger switch and the like in a second illustrative embodiment.
Figure 9B:
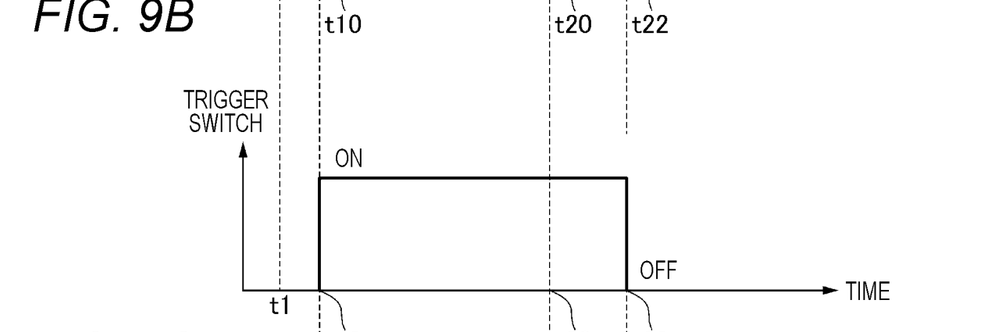

FIG. 9B shows an example of a temporal change in the state of the trigger switch 12. The operation performed on the trigger switch 12 in this example is the same as the operation performed in the example of FIG. 5A. FIG. 9A shows an example of a temporal change in a state of the mode switch 13. In this example, the mode switch 13 is turned on at a time t1, which is before a time t10, and is turned off at a time t22.

Figure 9C:
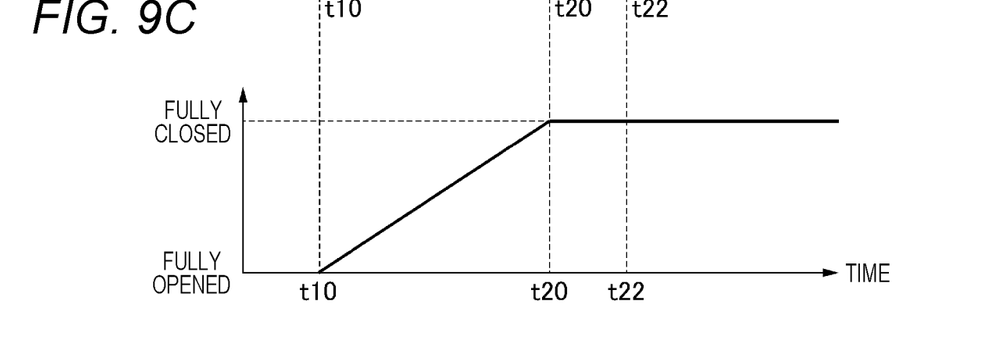

FIG. 9C shows an example of a change in the position of the cutting blades 111 when the trigger switch 12 and the mode switch 13 are operated as described above. When the trigger switch 12 is turned on at the time t10, similar to the previous examples, the cutting blades 111 start to move in the closing direction. However, if both the trigger switch 12 and the mode switch 13 are kept in the ON state, the cutting blades 111 remain stopped after reaching the fully closed position and do not automatically return to the fully opened position. Then, even when the trigger switch 12 and the mode switch 13 return to the OFF state, the cutting blades 111 remain stopped at the fully closed position.

Accordingly, if both the trigger switch 12 (first operation unit) and the mode switch 13 (second operation unit) are in the ON state, the control unit 530 of the cutting device 10 according to the present illustrative embodiment performs control to keep the cutting blades 111 in the closed state after performing an operation of closing the pair of cutting blades 111. This control will be referred to as "closed-keep control" below.

If the mode switch 13 is kept in the OFF state and only the trigger switch 12 is turned on, the control unit 530 performs normal control similar to that described in the first illustrative embodiment, that is, control that causes the pair of cutting blades 111 to close and then opens the cutting blades 111.

Figure 10:
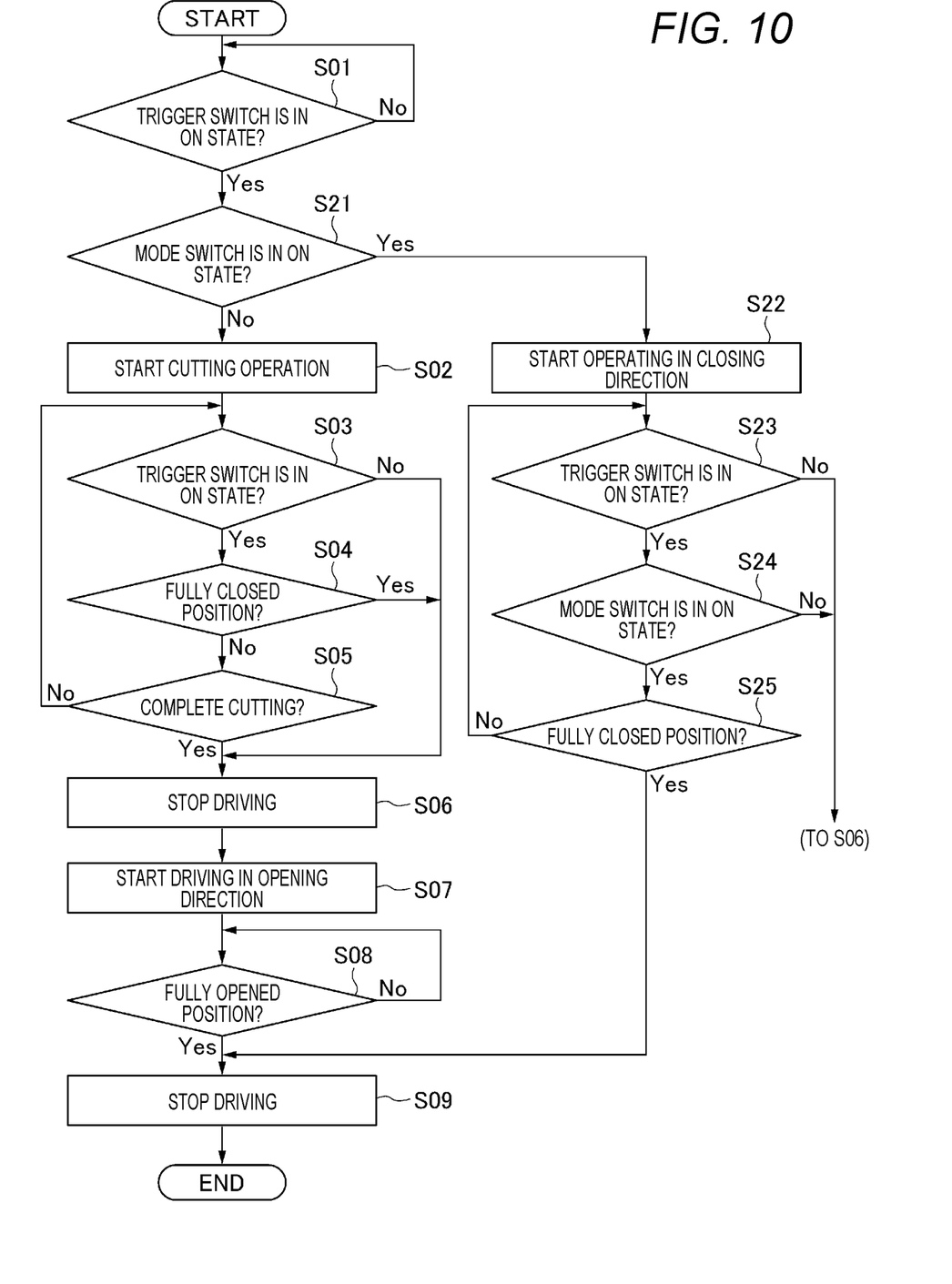
FIG. 10 is a flowchart showing a flow of processing executed by the control board.

A specific flow of processing executed by the control board 500 according to the present illustrative embodiment will be described with reference to FIG. 10. A series of processing shown in FIG. 10 is executed by the control board 500 according to the present illustrative embodiment instead of the series of the processing shown in FIG. 7. Among steps shown in FIG. 10, the steps common to those shown in FIG. 7 are given the same reference numerals (such as "S01") as in FIG. 7. A flowchart in FIG. 10 is obtained by adding processing of steps S21 to S25 to the flowchart in FIG. 7.

In step S01, when it is determined by the control board 500, for example, that the trigger switch 12 enters into the ON state, the processing proceeds to step S21 in the present illustrative embodiment. In step S21, it is determined by the control board 500, for example, whether the mode switch 13 is in the ON state. If the mode switch 13 is kept in the OFF state, the processing in and after step S02 is executed, and normal control similar to that in the first illustrative embodiment is executed. If the mode switch 13 is in the ON state, the processing proceeds to step S22.

In step S22, the control unit 530 performs processing of driving the electric motor 400 to start operating the cutting blades 111 in the closing direction. Accordingly, the closed-keep control is started.

In step S23 following step S22, it is determined by the control board 500, for example, whether the trigger switch 12 is in the ON state. If the trigger switch 12 is kept in the ON state, the processing proceeds to step S24.

In step S24, it is determined by the control board 500, for example, whether the mode switch 13 is in the ON state. If the mode switch 13 is kept in the ON state, the processing proceeds to step S25.

In step S25, it is determined by the control board 500, for example, whether the cutting blades 111 reach the fully closed position. The processing performed here is the same as the processing performed in step S04. If the cutting blades 111 do not reach the fully closed position, the processing in and after step S23 is executed again while continuing the operation of the cutting blades 111 toward the fully closed position. If the cutting blades 111 reach the fully closed position, the processing proceeds to step S09. Accordingly, the closed-keep control is completed, and the cutting blades 111 remain stopped at the fully closed position.

If the trigger switch 12 is turned off in step S23 or if the mode switch 13 is turned off in step S24 while the closed-keep control is being executed, the processing proceeds to step S06. As a result, the closed-keep control is interrupted and the cutting blades 111 are returned to the fully opened position. The cutting device 10 returns to the standby state under the normal control.

As described above, after starting the closed-keep control in step S22, if at least one of the trigger switch 12 (first operation unit) and the mode switch 13 (second operation unit) enters into the OFF state at a timing before the operation of closing the pair of cutting blades 111 is completed (if it is determined No in step S23 or S24), the control unit 530 of the cutting device 10 according to the present illustrative embodiment stops the operation of closing the cutting blades 111 (step S06). Then, the control unit 530 starts the operation of opening the cutting blades 111 (step S07), and returns the cutting blades 111 to the fully opened position. Accordingly, the user can easily interrupt the closed-keep control and restart the work.

The present illustrative embodiment has been described above with reference to specific examples. However, the present disclosure is not limited to these specific examples. Design changes made by those skilled in the art as appropriate to these specific examples are also included within the scope of the present disclosure as long as the changes have characteristics of the present disclosure. Elements included in each of the specific examples described above, and arrangement, conditions, shapes, and the like of the elements are not limited to those illustrated, and can be changed as appropriate. The elements included in each of the specific examples described above can be appropriately combined as long as no technical contradiction occurs.

What is claimed is:

1. An electric cutting device, comprising:
a pair of cutting blades configured to clamp and cut an object;
an electric motor configured to generate a driving force necessary for operating the cutting blades;
a controller configured to:
control an operation of the electric motor;
monitor one or more operating parameters of the electric motor; and
determine that cutting of the object by the cutting blades is completed based on detecting a change in value of the one or more operating parameters that satisfies a threshold condition indicative of breakage of the object; and
an operation switch configured to be switched between an ON state and an OFF state by a user operation,
wherein after the operation switch enters into the ON state and the pair of cutting blades start operating in a closing direction, the controller is configured to:
start an operation of opening the pair of cutting blades in a case where the cutting of the object is completed while the operation switch is kept in the ON state; and
stop an operation of closing the pair of cutting blades in a case where the operation switch changes from the ON state to the OFF state at a timing before the cutting of the object is completed.

2. The cutting device according to claim 1, wherein the controller is configured to:
start the operation of opening the pair of cutting blades after the operation device-switch changes from the ON state to the OFF state and the operation of closing the pair of cutting blades is stopped.

3. The cutting device according to claim 1, wherein in the determining, the controller is configured to perform the determination based on current supplied to the electric motor.

4. The cutting device according to claim 3, wherein in the determining, the controller determines that the cutting of the object by the cutting blades is completed in a case where the current supplied to the electric motor decreases by a predetermined percentage from a maximum value of the current.

5. The cutting device according to claim 1, wherein in the determining, the controller is configured to perform the determination based on a number of rotations of the electric motor.

6. The cutting device according to claim 1, wherein the controller is configured to:
start the operation of opening the pair of cutting blades even if the cutting blades reach a predetermined position while the operation switch is kept in the ON state.

7. The cutting device according to claim 6, wherein the controller is configured to:
stop the operation of closing the pair of cutting blades in a case where the operation switch changes from the ON state to the OFF state at a timing before the cutting blades reach the predetermined position and before the cutting of the object is completed.

8. The cutting device according to claim 1, wherein the one or more operating parameters include a first parameter indicative of rotational movement of the electric motor and a second parameter indicative of an electrical state of the electric motor.

9. An electric cutting device, comprising:
a pair of cutting blades configured to clamp and cut an object;
an electric motor configured to generate a driving force necessary for operating the cutting blades;
an operation switch configured to be switched between an ON state and an OFF state by a user operation; and
a controller configured to:
control an operation of the electric motor; and
determine whether cutting of the object by the cutting blades is completed; and
wherein after the operation switch enters into the ON state and the pair of cutting blades start operating in a closing direction, the controller is configured to:
start an operation of opening the pair of cutting blades in a case where the cutting of the object is completed while the operation switch is kept in the ON state; and
stop an operation of closing the pair of cutting blades in a case where the operation switch changes from the ON state to the OFF state at a timing before the cutting of the object is completed, wherein the operation switch includes a first operation switch and a second operation switch provided at different positions, and wherein the controller is configured to:

in a case where only the first operation switch enters into the ON state, perform normal control to perform the operation of opening the pair of cutting blades after performing the operation of closing the pair of cutting blades, and in a case where both the first operation switch and the second operation device switch enter into the ON state, perform closed-keep control to maintain the pair of cutting blades in a closed state after performing the operation of closing the pair of cutting blades.

10. The cutting device according to claim 9, wherein the controller is configured to:

stop the operation of closing the pair of cutting blades in a case where at least one of the first operation switch and the second operation switch enters into the OFF state at a timing after starting the closed-keep control and before the operation of closing the pair of cutting blades is completed.

11. The cutting device according to claim 10, wherein the controller is configured to:

start the operation of opening the pair of cutting blades after at least one of the first operation switch and the second operation switch enters into the OFF state and the operation of closing the pair of cutting blades is stopped.

* * * * *